Sept. 6, 1966  P. R. GEORGE, SR  3,270,712
MILKING MACHINE CLAW

Filed July 29, 1964  3 Sheets-Sheet 1

INVENTOR
PAUL ROBERT GEORGE, Sr.
BY Herbert A. Neinturn
ATTORNEY

Sept. 6, 1966 P. R. GEORGE, SR 3,270,712
MILKING MACHINE CLAW
Filed July 29, 1964 3 Sheets-Sheet 2

INVENTOR
PAUL ROBERT GEORGE, Sr.
BY Herbert A. Minturn
ATTORNEY

United States Patent Office 3,270,712
Patented Sept. 6, 1966

3,270,712
MILKING MACHINE CLAW
Paul R. George, Sr., Cambridge City, Ind., assignor to Golay & Co., Inc., Cambridge City, Ind.
Filed July 29, 1964, Ser. No. 385,960
3 Claims. (Cl. 119—14.36)

This invention relates to an improved milking machine claw embodying milk tubes and a pulsating air manifold.

A primary object of the invention is to provide a claw in which no pocket or chamber in which milk may collect and swirl around in circles or spirals before going out the milk line.

To the contrary, the claw constituting the invention herein provides for a diagonal flow of milk entering a standpipe at a common elevation, and a vent or air breather hole is provided above the junctures of the milk nipples attached to the standpipe so that there is no tendency for the milk to be delayed in its downward and outward flow.

A further important object of the invention is to reduce the over-all weight of the claw. Normally these claws would be made out of stainless steel, and in the claws heretofore made, the stainless steel will be of such a mass that it will weigh several pounds, all of which are supported by the teat cups which are held on the teats by a vacuum pressure primarily.

A still further important object of the invention resides in the peculiar construction of the claw of this invention whereby sanitation is promoted in view of the fact that the claw is very easily cleaned since it has no internal pockets or ledges or grooves normally retaining a bit of milk.

These and many other objects and advantages of the invention will become apparent to those versed in the art from the following description of the invention which is made in connection with the accompanying drawings, in which FIG. 1 is a view in side elevation and partial section of a structure embodying the invention;

A short, normally vertically disposed standpipe 10 is provided to be open at its top end. The standpipe 10 turns horizontally into a substantially right angle extension 11 which is connected to a milk tube 12 shown in FIG. 1.

Figure 5:
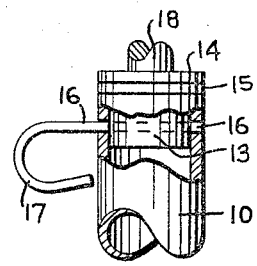
FIG. 5 is a detail in side elevation and partial section of the mounting of the pulsation tube manifold.

The top end of the standpipe 10 is closed by a plug 13, FIG. 5, which enters the pipe 10 with a sliding fit. The top end of the plug 13 is provided with a cap 14 which has a diameter approximating that of the external diameter of the standpipe 10. Normally a gasket or O ring 15 surrounds the plug 13 immediately under the flange 14 and bears against the upper end of the pipe 10, or with an O ring which fits within the pipe 10, as a sealing means. The plug 13 is secured in place by means of a pin 16 which enters through the side of the pipe 10, passes entirely through the plug 13, and enters the opposite side of the pipe 10, all as shown in FIG. 5. Preferably a finger grip 17 is provided on the pin 16, herein shown as consisting of a loop of the pin.

A short post 18 is fixed to the top of the plug 13 and extends a short distance thereabove. To this post 18 there is attached a manifold tube 19. This tube 19 is normally connected to the pulsating line wherein the pressure alternates between a vacuum pressure and atmospheric pressure. This action of the pulsations is well known to those versed in the art, and illustration of the means for so producing the pulsations is not herein shown since it does not enter per se into the invention. In any event, the tube 19 receives over one end the connecting tube 20, FIG. 1. The end of the tube 19 opposite from the tube connecting end 21 is closed and carries a loop member 22 as a means for hanging the claw in some convenient position while not being used in the milking operation.

The manifold tube 19 carries a pair of nipples 23, 24 extending at approximately right angles to the tube 19 on one side, and a like pair 25, 26 extending from the tube 19 on opposite side. These tubes 23, 24 and 25, 26 are directly connected to the manifold so that there may be air flow to and from the manifold 19 through the tubes as set up through the connecting tube 20.

Figure 3:
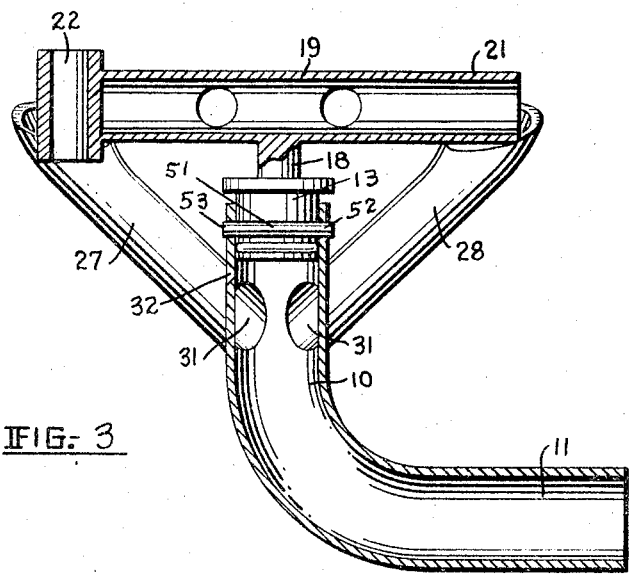
FIG. 3 is a view in vertical section on the line 3—3 in FIG. 2, on a further enlarged scale.

Four milk tube nipples 27, 28, 29, and 30 are provided and supported by the standpipe 10. Each of the milk tube nipples have passageways therethrough opening at a common elevation within the standpipe 10 as indicated in the drawings, all of the milk tube nipples are inclined upwardly from the standpipe 10, and are equally spaced apart circumferentially around the pipe 10. Referring to FIG. 3, it is to be observed that the openings generally designated by the numeral 31 in each of these milk tube nipples open into the standpipe 10 near its upper end and slightly below the underside of the plug 13. The standpipe 10 is further provided with a bleed hole 32 above the levels of the passageways 31 and below the plug 13, FIG. 3 and FIG. 4.

Figure 1:
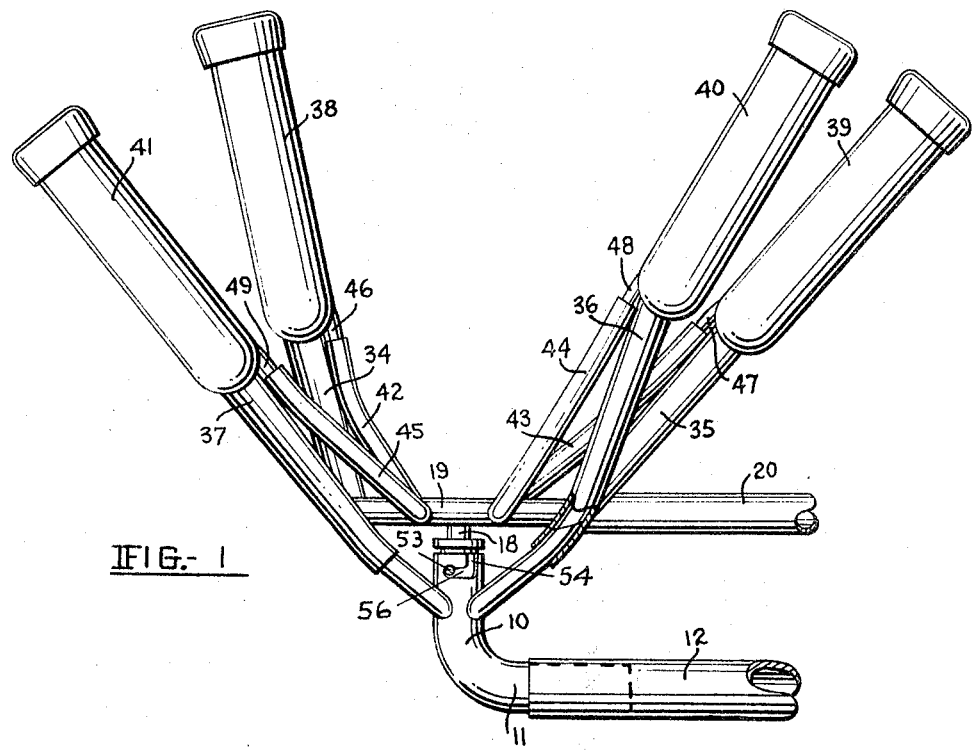
Figure 2:
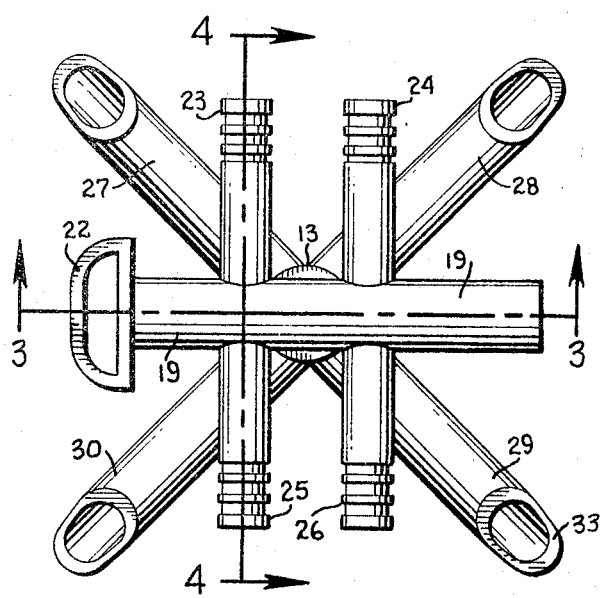
FIG. 2 is a view in top plan of the structure on a slightly larger scale.

Each of the milk tube nipples 27, 28, 29, and 30, has an outer end which is diagonally presented as at 33. In use, the inflation tubes are telescoped by their ends over the respective nipples 27, 28, 29, and 30 as indicated in FIG. 1. The inflation proper in each instance (not herein shown) is carried within the respective teat cups 38, 39, 40 and 41, all in the usual and well known manner. These tubes are flexible sufficiently so that when the teat cups are not turned upwardly as they are shown in FIG. 1, they will normally hang downwardly to have the inside of the tube in each instance shutting off the passageways into the milk tube nipples, so that, as is customarily done, one cup at a time may be lifted and slipped over the cow's teat and so on. This particular feature is also well known to dairymen, and theretofore further details need not be shown.

The pulsating air tube 20 is engaged over the open end of the manifold tube 19. Each of the nipples 23, 24, 25, and 26 receive the pulsation tubes respectively 42, 43, 44, and 45, and in turn are connected to the cup nipples 46, 47, 48, and 49.

The cross sectional area of the inside of the standpipe 10 and also of its turned portion 11 equals approximately the sum of the areas of the passages through the milk tube nipples. This relationship permits a rapid flow of the milk through the standpipe 10 and out through the connecting tube 12 which leads to the normally larger milk pipe conveying the milk to some predetermined collecting zone. The provision of the bleed hole 32 also ensures a rapid flow of the milk down through the standpipe 10 by admitting a very slight amount of air above that flow. It is to be remembered that the standpipe 10 and its connecting portion 11 are subjected to the milking pulsations of vacuum.

Conventional claws heretofore employed have a bowl of varying size into which the four milk tubes enter horizontally, and from which a separate larger tube conveys the milk on to the milk tube or hose. This conventional type of claw tends to set up a flooding or filling with milk because of the poor flow characteristics. This flooding can choke off the equal supply of vacuum to each of the four milk tubes and thus onto the individual teat cup. This action can cause a very poor milking from these flooded or choked teat cups with the end result that there is unequal milking of the quarters of the cow's udder and therefore there is a slow over-all milking and simultaneously an over milking of unobstructed quarters. The present invention above described overcomes those difficulties. It is to be understood, that the desired operation is one of rapid milking with a low vacuum pressure application for the comfort of the cow, resulting in "letting down" of the milk more quickly, and also resulting in more comfort to the cow.

Figure 4:
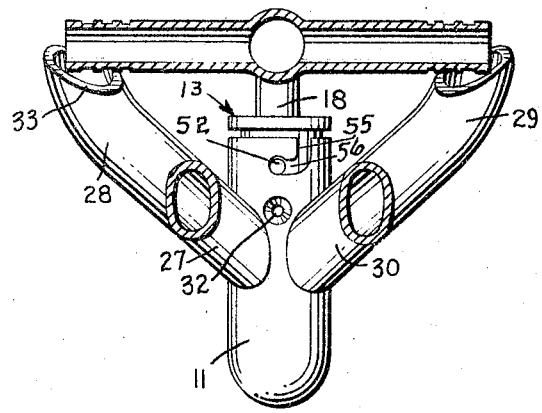
FIG. 4 is a view in vertical section on the line 4—4 in FIG. 2.

The plug 13 has been illustrated and described and shown in one form in reference to FIG. 5, a variation may be employed in the form of a bayonet connection as illustrated in FIGS. 3 and 4. In this form there is a pin 51 extending diametrically through the plug 13 to have short end portions 52 and 53 extend from the sides of the plug. These pin portions 52 and 53 enter vertical slots 54 and 55 opening from the top end of the standpipe 10. A horizontal slot 56 extends circumferentially from the lower ends of the slots 54 and 55. The pin portions 52 and 53 are entered in the horizontal slots 56 by rotating the plug 13 to come to upwardly extending portions of the slots 56 as means releasably retaining the plug 13 in the top end of the pipe 10. A compressible gasket (not shown) may be carried around the plug 13 under the flange 14 if the fit between the plug and the inner wall of the pipe 10 is not sufficient to affect the vacuum pressure to any appreciable degree.

Figure 6:
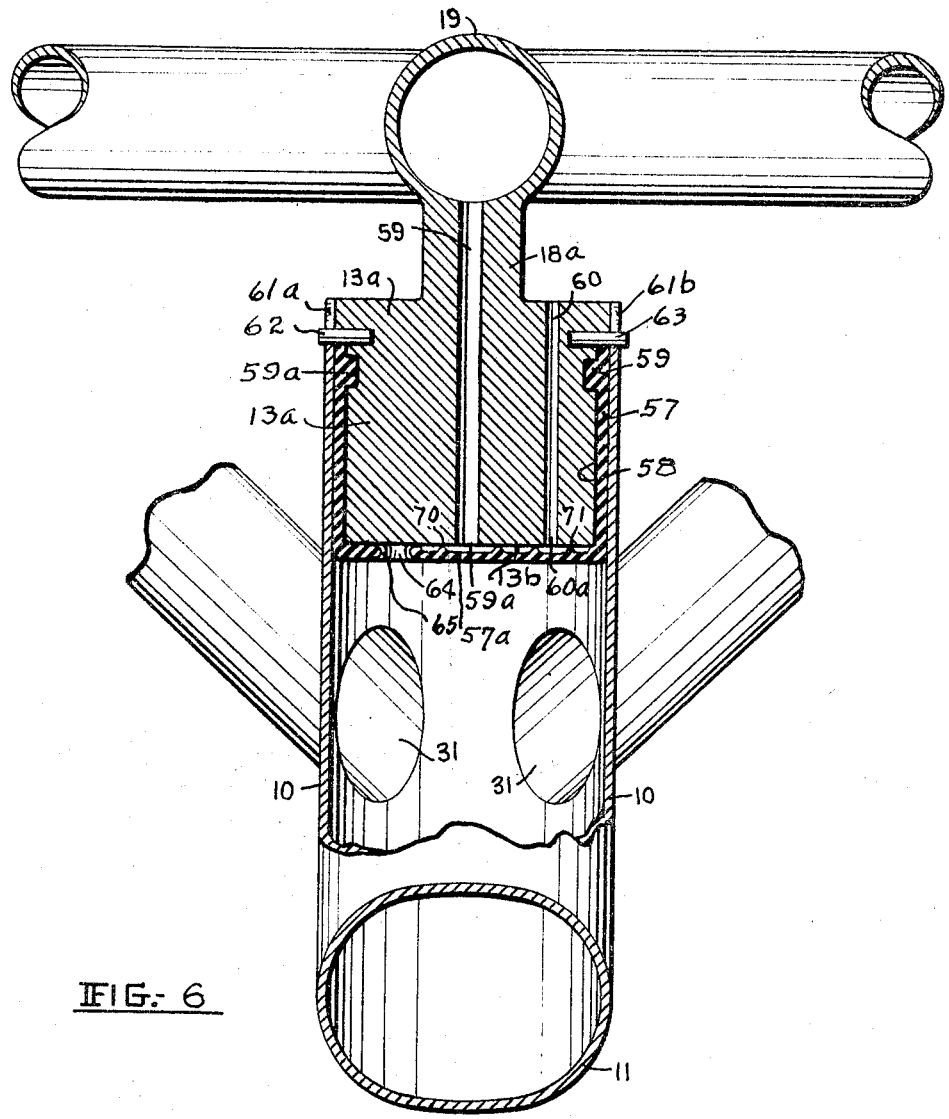
FIG. 6 is a vertical section through the standpipe of a further modification, and on a greatly enlarged scale.

A further modification of the structure is illustrated in FIG. 6 of the drawings, wherein the manifold tube 19 is mounted on a post 18a in turn mounted on a plug 13a. A bore 59 opening into the manifold tube 19 extends therefrom down through the plug 13a and opens on its underside at 59a. A second bore 60 extends through the plug 13a, open from the topside of the plug and open at its bottom end at the opening 60a.

A rubber or rubber-like cup 57 fits snugly over the bottom 13b and the major height of the side wall 58 of the cup 13a. The cup 57 is provided by an inner integral ring 59 which fits snugly in an annular channel 59a surrounding the cup 13a near its upper end. This channel in the form shown is rectangular in cross-section and serves to retain the cup 57 in snug fit across the bottom 13b and around the side of the plug 13a.

Bayonet plug securing means is provided to secure the plug 13a in the standpipe 10. Pins 62 and 63 are secured to the plug 13a in any suitable manner and have protruding ends entered in vertical slots 61a and 61b to be carried into the usual circumferential slots at the slot lower ends, the circumferential slots conforming to the slots 56 shown in FIGS. 1 and 4. The channel 59a is preferably below the pins 62, 63. In the floor 57a of the cup 57, there is a hole 64 therethrough defined by a grommet 65.

Remembering that the manifold tube 19 is alternately charged with a vacuum pressure and atmospheric pressure, and the standpipe 10 is subjected to a continuous vacuum pressure normally at one inch of mercury below the maximum vacuum pressure in the tube 19, this modified form operates in the following manner.

When there is vacuum pressure in the manifold tube the cup floor 57a will be drawn up against the plug floor or bottom 13b, thereby sealing off the bore openings 59a and 60a. The hole 64 is likewise sealed over by the floor portion around the grommet 65 being in intimate contact with the plug floor 13b. As above indicated the vacuum pressure in the standpipe is approximately constant and it is the differential pressure between that in the tube 19 and the pipe 10 which permits the lower vacuum pressure to seat the cup floor as described.

In the cycle of the tube 19 being under the vacuum pressure, vacuum in the pipe 10 withdraws milk through the nipples 27, 28, 29 and 30. When the tube 19 is next subjected to atmospheric pressure, the cup floor 13b is pressed downwardly by air flowing down the bore 59, and in so doing the floor 13b uncovers both the bore openings 59a and 60a to admit air flow through the hole 64 into the pipe 10 behind the milk flow in the standpipe, thereby aiding in quick discharge of the milk into the milk withdrawal tube 12.

The hole 64 is quite small in diameter, being approximately within the diameter range of from 0.032 to 0.048 of an inch. Due to this relatively small diameter in comparison with that of the pipe 10, the vacuum pressure in the pipe 10 is not raised toward atmospheric pressure to disturb the withdrawal of the milk. In fact bleeding in air behind the "slug" of outflowing milk aids in clearing the nipples 27, 28, 29, and 30 of downflowing milk and, at the same time, does not introduce sufficient air to produce rancidity of the milk.

When the tube 19 is again evacuated, the bores 59a and 60a are again closed, as well as the hole 64, all when the milk flow is again induced. Preferably, the cup floor 57a is provided with a seating ring 70 concentric with the axis of the bore 59 and slightly larger in diameter than that of the bore 59. Likewise, the floor 57a carries a second seating ring 71 concentric of the bore 60 opening 60a.

Thus the inlet of air to the pipe 10 is controlled in valve-like manner automatically in accordance with the pressure differentials in pressure acting upon the cup floor which is, in effect, a diaphragm.

While I have herein shown and described my invention in the particular forms, it is obvious that structural variations may be employed without departing from the spirit of the invention, and I therefore do not desire to be limited to those precise forms beyond the limitations which may be imposed by the following claims.

I claim:
1. For a milking machine,
   a member receiving milk and having an approximately constant internal vacuum pressure;
   a milk discharge line leading from said member;
   tube means within which pressure cyclicly varies between atmospheric and vacuum;
   means providing a surface within said member through which a passageway leading from said tube means opens;
   a passageway leading from the atmosphere and opening through said surface;
   a flexible diaphragm disposed across said surface and covering the openings of both of said passageways; and
   said diaphragm being carried toward and away from said passageways, alternately closing off and opening them under differential pressures set up on opposite sides of the diaphragm, providing an admittance of atmospheric air to said member in accordance with milk flow into said discharge line;
   said diaphragm having an opening to one side of said passageways to transmit said atmospheric air therethrough.

2. A milking machine claw comprising a tubular standpipe having a length normally,
   essentially vertically disposed and having a smooth, constant diameter internal wall throughout said length; and
   four milk flow nipples carried by and around said standpipe and equally spaced apart circumferentially, each having an internal passageway opening into said standpipe;
   said nipples being directed upwardly and outwardly from said standpipe with their axes at common acute angles to the axis of the standpipe, the nipple passageways discharging into the standpipe at a common elevation spaced from the top end of the standpipe; and
a breather device comprising a plug in the upper end of said standpipe;
a flexible diaphragm carried across the underside of the plug;
said plug having a first bore therethrough subjected to alternating vacuum and atmospheric pressures, the bore opening through the under surface of the plug;
said plug also having a second bore leading from the atmosphere to open through said surface in a zone removed from said pressure bore opening; and
said diaphragm having a small hole therethrough spaced from both of said bore openings;
the varying pressures in said first bore pulling and releasing said diaphragm to close and open the two passageways permitting atmospheric air flow through the second bore and through said diaphragm small hole into said standpipe when said first bore is subjected to approximately atmospheric pressure.

3. The structure of claim 1, in which said tube is normally vertically disposed; and there is a plug detachably closing the upper end of said tube;
said surface being the underside of the plug;
a flexible cup enclosing the lower portion of said plug and extending across said surface of the plug as said diaphragm; and
said cup extending upwardly between the plug and said tube as a sealing means therebetween.

References Cited by the Examiner
UNITED STATES PATENTS

| | | | |
|---|---|---|---|
| 784,780 | 3/1905 | Burrell | 119—14.36 |
| 2,460,426 | 2/1949 | Maes | 119—14.37 |
| 2,585,178 | 2/1952 | Sherwood | 119—14.54 |
| 2,929,354 | 3/1960 | Stevens | 119—14.54 |
| 3,139,856 | 7/1964 | Lippke | 119—14.36 |

FOREIGN PATENTS

| | | |
|---|---|---|
| 7113/32 | 8/1932 | Australia. |
| 508,680 | 2/1952 | Belgium. |

SAMUEL KOREN, *Primary Examiner.*

HUGH R. CHAMBLEE, *Examiner.*